US007394459B2

(12) United States Patent  
Bathiche et al.

(10) Patent No.: US 7,394,459 B2  
(45) Date of Patent: Jul. 1, 2008

(54) INTERACTION BETWEEN OBJECTS AND A VIRTUAL ENVIRONMENT DISPLAY

(75) Inventors: Steven Bathiche, Bellevue, WA (US); David Joshua Kurlander, Seattle, WA (US); Andrew D. Wilson, Seattle, WA (US); Christina Summer Chen, Redmond, WA (US); Joel P. Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 688 days.

(21) Appl. No.: 10/834,675

(22) Filed: Apr. 29, 2004

(65) Prior Publication Data

US 2005/0245302 A1 Nov. 3, 2005

(51) Int. Cl.
*G06F 3/042* (2006.01)
*G06F 3/01* (2006.01)

(52) U.S. Cl. .................. 345/175; 345/156; 345/173; 715/700; 715/702; 715/866

(58) Field of Classification Search .................. 345/156, 345/175, 632, 633, 168, 173; 715/700, 702, 715/866; 463/9, 14, 30, 31, 36, 37, 38, 39
See application file for complete search history.

(56) References Cited

U.S. PATENT DOCUMENTS

| | | | |
|---|---|---|---|
| 4,992,650 A | | 2/1991 | Somerville .................. 235/462 |
| 5,436,639 A | * | 7/1995 | Arai et al. .................... 345/156 |
| 5,483,261 A | | 1/1996 | Yasutake |
| 6,128,003 A | * | 10/2000 | Smith et al. .................. 345/156 |
| 6,266,061 B1 | | 7/2001 | Doi |
| 6,522,395 B1 | | 2/2003 | Barnji |
| 6,529,183 B1 | * | 3/2003 | MacLean et al. ............ 345/156 |

(Continued)

FOREIGN PATENT DOCUMENTS

EP 0690407 1/1996

(Continued)

OTHER PUBLICATIONS

Shen et al., "DiamondSpin: an extensible toolkit for around-the-table interaction", Apr. 24-29, 2004, Proceedings of the SIGCHI conference on Human factors in computing systems CHI '04, vol. 6, No. 1, pp. 167-174.*

(Continued)

*Primary Examiner*—My-Chau T Tran
(74) *Attorney, Agent, or Firm*—Workman Nydegger

(57) ABSTRACT

An interactive table has a display surface on which a physical object is disposed. A camera within the interactive table responds to infrared (IR) light reflected from the physical object enabling a location of the physical object on the display surface to be determined, so that the physical object appear part of a virtual environment displayed thereon. The physical object can be passive or active. An active object performs an active function, e.g., it can be self-propelled to move about on the display surface, or emit light or sound, or vibrate. The active object can be controlled by a user or the processor. The interactive table can project an image through a physical object on the display surface so the image appears part of the object. A virtual entity is preferably displayed at a position (and a size) to avoid visually interference with any physical object on the display surface.

34 Claims, 8 Drawing Sheets

U.S. PATENT DOCUMENTS

| | | | |
|---|---|---|---|
| 6,614,422 B1 * | 9/2003 | Rafii et al. | 345/168 |
| 6,710,770 B2 * | 3/2004 | Tomasi et al. | 345/156 |
| 6,720,949 B1 * | 4/2004 | Pryor et al. | 345/158 |
| 7,084,859 B1 * | 8/2006 | Pryor | 345/173 |
| 2001/0012001 A1 | 8/2001 | Rekimoto | |
| 2003/0161524 A1 | 8/2003 | King | |
| 2004/0090524 A1 | 5/2004 | Belliveau | |
| 2004/0196371 A1 | 10/2004 | Kono | |
| 2005/0226505 A1 | 10/2005 | Wilson | |
| 2005/0277071 A1 | 12/2005 | Yee | |
| 2005/0281475 A1 | 12/2005 | Wilson | |
| 2006/0010400 A1 * | 1/2006 | Dehlin et al. | 715/856 |

FOREIGN PATENT DOCUMENTS

| | | |
|---|---|---|
| FR | 27656077 | 5/1998 |
| WO | 9819292 | 5/1998 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1,2-Dimensional Bar Code Page." Avaliable http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3 pp.

Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5 pp.

Dietz and Leigh. "DiamondTouch: A Multi-User Touch Technology." *UIST '01* Orlando FLA. ® ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. ®2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter."*Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment" *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3 pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997, 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8 pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews*, TablePCHome.com—*Table PC user community*, Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation."*Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3(2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VirtualBoard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03-0010. pp. 193-202.

Hardenberg Von. Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation System, New York, NY, vol. 1, No. 2., Jun. 2000, pp. 78-80.

Office Action mailed Aug. 30, 2007 cited in related U.S. Appl. No. 10/870,777.

Office Action mailed Oct. 9, 2007 cited in related U.S. Appl. No. 10/867,434.

* cited by examiner

INTERACTION BETWEEN OBJECTS AND A VIRTUAL ENVIRONMENT DISPLAY

FIELD OF THE INVENTION

This invention generally pertains to a method and apparatus wherein an interaction occurs between a virtual environment displayed on a surface and objects placed on the display surface, and more specifically, pertains to facilitating an interaction between graphic images displayed on a display surface and passive and/or active objects that are placed on or positioned near the display surface.

BACKGROUND OF THE INVENTION

Virtual environments are typically employed in electronic games that are played on game consoles, personal computers, and other types of computing devices, as well as in other types of applications. A user usually interacts with objects in a virtual environment by manipulating a mouse, joystick, wheel, game pad, track ball, or other user input device that causes the virtual object to move in a specific manner or carry out some other action or function as defined by the software program that produces the virtual environment. The effects of a user interaction with an object in the virtual environment are generally visible on a display. For example, a user might be controlling a virtual object such as a spaceship or race car that is displayed in the virtual environment, so that the virtual object carries out some task. If the virtual object being controlled by the user strikes another virtual object, it may be "destroyed," as shown by graphic images indicating the destruction on the display. In certain games, the game console or computer may control other virtual objects in the environment, either in support of the user's task, or to oppose its completion. Thus, the interaction between virtual objects in a virtual environment is well known.

Another form of user input employs displays that are responsive to the touch of a user's finger or a stylus. Touch responsive displays can be pressure activated, responsive to electrical capacitance, changes in magnetic field intensity, employ surface acoustic waves, or respond to other variables that indicate the location of a finger or stylus on the display. Another type of touch sensitive display includes a plurality of optical sensors spaced-apart around the periphery of the display screen so that the location of a finger or stylus touching the screen can be detected. Using one of these touch sensitive displays, a user can more directly control a virtual object that is displayed. For example, the user may touch the displayed virtual object to select it and then drag the object to a new position on the touch-sensitive display.

However, in most such touch-sensitive displays, the response is only to the touch of the finger or stylus at a point. There is another type of interaction with a virtual environment that might provide a much richer experience for the user. While virtual environments, such as games, often include virtual objects that are displayed on a screen, it would be desirable for the virtual environment to also respond to physical objects that are placed on the display surface. In most prior art touch-sensitive displays, the finger or stylus is not treated as a physical object that is actually within the virtual environment, but instead, is simply an alternative type of pointing device used to make selections or drag elements about on the screen. To be truly interactive to physical objects that are placed on it, a display surface should also be able to detect where a plurality of physical objects are placed on it, as well as detect different types of physical objects, each of which might provide a different interactive experience for the user.

However, the capacitive, electromagnetic, optical, or other types of sensors used in conventional touch-sensitive displays typically cannot simultaneously detect the location of more than one finger or object touching the display screen at a time, and thus, would be unable to detect the location or each different type of a plurality of different types of physical objects placed thereon. These prior art touch-sensing systems are generally incapable of detecting more than a point of contact and are unable to detect the shape of an object proximate to or touching the display surface. Even capacitive or resistive, or acoustic surface wave sensing display surfaces that can detect multiple points of contact are unable to image objects on a display surface to any reasonable degree of resolution. Prior art systems of these types cannot detect patterns on an object or detailed shapes that might be used to identify each object among a plurality of different objects that are placed on a display surface.

Another approach that has been developed in the prior art uses cameras mounted to the side and above a horizontal display screen to visually capture an image of a user's finger or other objects that are touching the display screen. This multiple camera mounting configuration is clearly not a compact system that most people would want to use in a residential setting. In addition, the accuracy of this type of multi-camera system in responding to an object that is on or proximate to the display surface depends upon the capability of the software used with the system to visually recognize objects and their location in three-dimensional space. Furthermore, the view of one object by one of the cameras may be blocked by an intervening object.

To address many of the problems inherent in the types of touch-sensitive displays discussed above, a user interface platform was developed in the MIT Media Lab, as reported by Brygg Ullmer and Hiroshi Ishii in "The metaDESK: Models and Prototypes for Tangible User Interfaces," *Proceedings of UIST* 10/1997:14-17. The metaDESK includes a near-horizontal graphical surface used to display two dimensional geographical information. Above the graphical surface is disposed an arm-mounted flat-panel display that serves as an "active lens" for use in displaying three dimensional geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface. The IR camera can detect a distinctive pattern provided on the undersurface of passive objects called "phicons" that are placed on the graphical surface. Magnetic-field position sensors and electrical-contact sensors are also included in the metaDESK. For example, in response to the IR camera detecting the IR pattern (which is transparent to visible light) applied to the bottom of a "Great Dome phicon," a map of the MIT campus is displayed on the graphical surface, with the actual location of the Great Dome in the map positioned where the Great Dome phicon is located. Moving the Great Dome phicon over the graphical surface manipulates the displayed map by rotating or translating the map in correspondence to the movement of the phicon by a user. This paper notes that all of the objects or phicons used with the graphical display surface are passive, so that the display system simply responds to a phicon by producing a specific graphic image, but the phicon does not itself respond to the virtual environment.

A similar approach to sensing objects on a display surface is disclosed in several papers published by Jun Rekimoto of Sony Computer Science Laboratory, Inc. in collaboration with others. These papers briefly describe a "HoloWall" and a "HoloTable," both of which use IR light to detect objects that are proximate to or in contact with a display surface on which a rear-projected image is visible. The rear-projection panel, which is vertical in the HoloWall and horizontal in the HoloTable, is semi-opaque and diffusive, so that objects become more clearly visible as they approach and then contact the panel. The objects thus detected can be a user's fingers or hands, or other objects. However, there is no discussion of active objects being placed on the surface of the display panel to carry out some active function involving an interaction with a virtual environment displayed on the screen.

It would be desirable to enable interaction within the virtual environment between physical objects that are placed on a display surface and virtual objects within the virtual environment, and to enable certain types of physical objects to respond to the virtual environment being displayed in an active and perceivable manner. Ideally, the interaction should go well beyond the use of a physical object to simply select and move a virtual object on a touch-sensitive screen. Although some types of objects placed on a display surface will be passive and only capable of being moved about on the display surface by the user's hand, other types of physical objects should be active and capable of responding to the virtual environment in an interactive manner. For example, it would be preferable if a physical object that looks like some form of vehicle were capable of moving over the display surface without being picked up and replaced at a different position by the user. Thus, a physical object that includes a small electric motor drivingly coupled to drive wheels on the object might be caused by either the user or the computing device creating the virtual environment to move around on the display surface and interact with virtual objects that are displayed thereon. It would also be desirable to employ other types of active functions in different types of active objects to respond to the virtual environment being displayed.

The interaction between physical objects and virtual objects in a displayed virtual environment might take different forms. For example, it would be desirable to be able to position a physical object on the display surface, have the software program executing the virtual environment recognize the physical object and its location, and then respond to the presence of the physical object when moving virtual objects within the virtual environment. Also, the virtual environment might respond to changes that are caused by the user, in the position of the physical object in the virtual environment. Thus, if the user moves a physical object to change its position or orientation on the display surface, in response, the virtual environment software program might respond by changing some function, parameter, or feature related to the virtual environment, such as the volume of sound produced by the virtual environment software.

Sensing the changing area and location of contact of a physical object with the display surface should also preferably result in a corresponding interaction with the displayed virtual environment. For example, if the physical object changes shape with varying pressure, the movement by the user of the object over the display surface should produce a corresponding stroke in the display that represents the changing shape of the object that is in contact with the display surface. These and other forms of interaction between a physical object on the display surface and the graphic images and virtual environment that are displayed thereon can provide a much more enjoyable and realistic experience for the user.

SUMMARY OF THE INVENTION

The present invention enables a blurring of the distinction between the real world of physical objects and a virtual environment in which virtual objects and graphic images are displayed on a display screen. To achieve this result, an interactive display has been developed that includes a display surface formed as the central part of a table top. A virtual environment is projected from below and viewed on the display surface. Any physical object that is disposed on the display surface can be optically detected by an IR camera that is disposed below the display surface and which is responsive to IR light that is reflected from the physical object. Once the physical object has been detected at a specific position using the camera, a software program controlling the virtual environment or graphic images being displayed then facilitates an interaction between the physical object and the virtual environment just as if the physical object were included within the virtual environment. Depending upon the type of physical object that is positioned atop the display surface, the interaction can be in two different modes. Specifically, in a first mode, the virtual environment that is displayed responds to the presence of the physical object on the display surface. In the second mode, the physical object responds to the virtual environment that is displayed, particularly, to changes in the virtual environment or graphic images that are displayed on the displayed surface.

Any movement of the physical object relative to the display surface is tracked by sensing changes in the location of the physical object on the display surface. Accordingly, the response to the physical object may then include changing a value of a parameter in the virtual environment in response to the movement of the physical object relative to the display surface.

The response to the physical object can also be implemented by the interaction of a virtual object in the virtual environment with the physical object. Thus, for example, the virtual object can be prevented from moving through a region in the virtual environment where the physical object is located on the display surface. If the physical object represents a wall in the virtual environment, a virtual object corresponding to a car controlled by a software program displaying the virtual environment would be caused to steer away from and avoid colliding with the wall at the location of the physical object on the display screen. This method can also detect at least one of a size and a shape of the physical object at a specific location on the display surface to enable the predefined response to the physical object within the virtual environment.

The method can also identify the physical object based upon IR light reflected from the physical object. For example, the IR light that is reflected may be encoded with a predefined pattern that is optically detected by the IR camera disposed below the display surface. The physical object can be a passive object that does not perform any active function that is perceptible to the user, or an active object that does. The active object might detect a signal produced within the virtual environment, such as a specific optical signal, causing the active object to perform the active function.

The active function can include producing one or more different types of perceptible conditions, such as emitting light, or producing a tone, or vibrating, or movement of the active object over the display surface. An active object that is mobile will be able to move itself over the display surface and interact with the virtual environment. For example, the active object can be a radio-controlled (RC) toy tank that moves about on the display surface as an electric motor drives treads on the toy tank. Or the toy tank might instead be controlled by modulating IR light from an IR source such as an IR light emitting diode (LED) that is disposed under the display surface, or by visible light pulses or modulation of the visible light produced by the image source used for producing the display seen on the display surface. For this and other types of active object, the active function of the active object can be controlled by the user, or alternatively, by the software program that produces the virtual environment. Electrical power can be provided to the active object by either a battery or a charged capacitor to enable the active object to perform certain active functions. A computing device executing the software can thus control an active object, which can in turn effect the behavior of a virtual object, and further effect the user, or vice versa. Many different interactive scenarios are clearly readily imaginable.

Other types of interaction are possible between a passive object and the virtual environment. For example, an image that is specific to the physical object and is visible through the physical object can be projected on the display surface where the physical object is disposed. The projected image will then be visible through the physical object and will appear to be part of the physical object, since the projected image will move about as the passive object is moved over the display surface.

Since a location of the physical object is determined in this method, a virtual entity can be displayed at a position on the display surface selected to avoid a visual interference between the virtual object and the physical object. The virtual entity comprises either a virtual object or information. Preferably, a plurality of prioritized or ordered positions are determined at which the virtual entity can be selectively displayed to avoid the interference with the physical object. A position that avoids the interference with the physical entity and having a highest priority is selected for display of the virtual entity. Also, the method preferably determines a location of a specific user who will be visually perceiving the virtual entity, so that the virtual entity is oriented and displayed at a position selected to enable the specific user to easily visually perceive the virtual entity. This position will be selected to avoid visual interference between the physical object and the virtual entity. If the virtual entity cannot be displayed without interference with the physical object at a highest priority location, a size of the virtual entity can be reduced to avoid the interference with the physical object.

Another aspect of the present invention is directed to a memory medium on which are stored machine executable instructions for carrying out the steps of the method.

Yet another aspect of the invention is directed to a system for enabling interaction between a virtual environment and a physical object. The system comprises an interactive display that includes a display surface on which the virtual environment is displayed, and a sensor for detecting a physical object placed on the display surface. A processor is coupled to the interactive display and to a memory in which are stored machine instructions. When executed by the processor, the machine instructions cause the processor to carry out a plurality of functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 11:
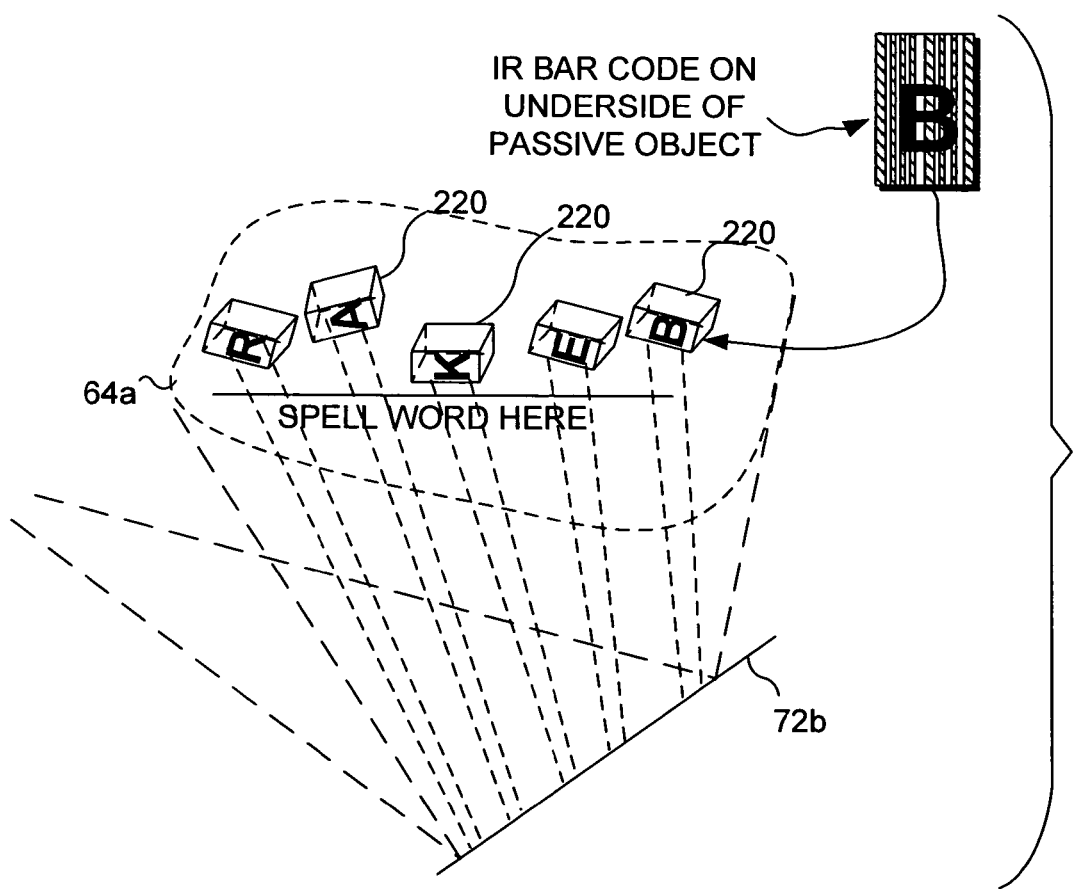
Figure 12:
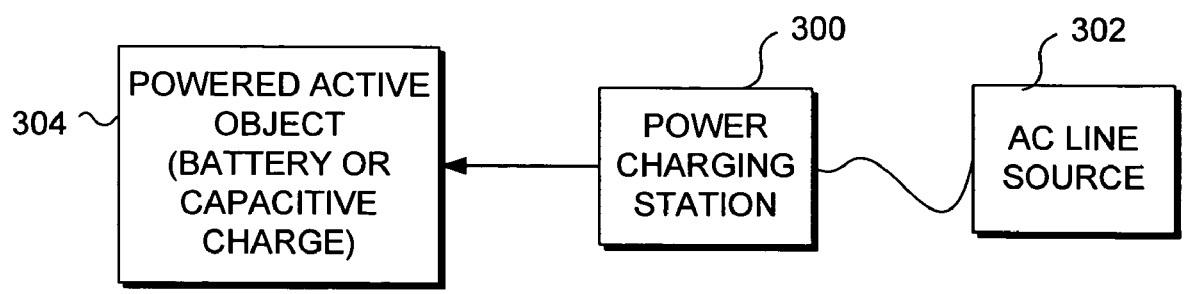

FIG. 11 is an isometric view of a portion of the display surface showing letters projected onto the bottom of transparent blocks through the display surface, so that the transparent blocks, which are identified by unique encoding patterns, can be rearranged to spell a word in a children's spelling program; and FIG. 12 illustrates how an energy source in an active object can be recharged by a power charging station.

DESCRIPTION OF THE PREFERRED EMBODIMENT

Exemplary System for Implementing Present Invention

Figure 1:
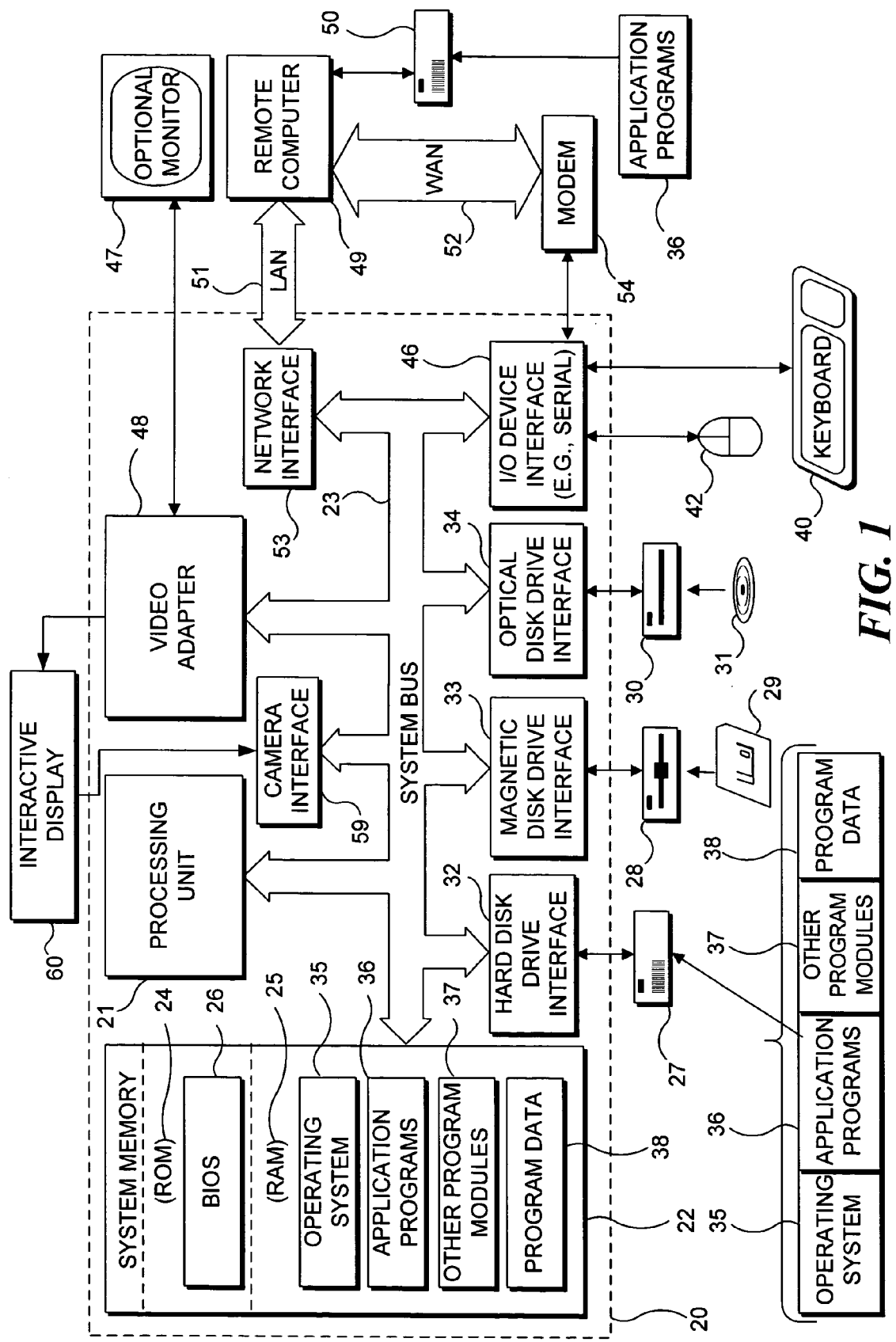
FIG. 1 is a functional block diagram of a generally conventional computing device or personal computer (PC) that is suitable for processing the input and output data used in practicing the present invention.

With reference to FIG. 1, an exemplary system suitable for implementing various portions of the present invention. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in to PC 20, and provide control input through input devices such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display of the present invention can provide a much richer display and interaction with the user for display and input of information and control of software applications and is therefore coupled to the video adaptor. In addition to the monitor, PCs are often coupled to other peripheral output devices (not shown), such as speakers (through a sound card or other audio interface—not shown) and printers. It is also contemplated that PC 20 may be coupled to active objects placed on the display surface through a peer-to-peer radio (e.g. Bluetooth) system (not shown) which would allow it to communicate with the active objects. Alternatively, a controller can be coupled to the PC through an appropriate I/O port, and the controller can be coupled to one more active objects through an appropriate wired, RF link, or other type of wireless link, including through light signals—either visible or IR, which are produced by sources included in the interactive table, as discussed below.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Interactive Table

Figure 2:
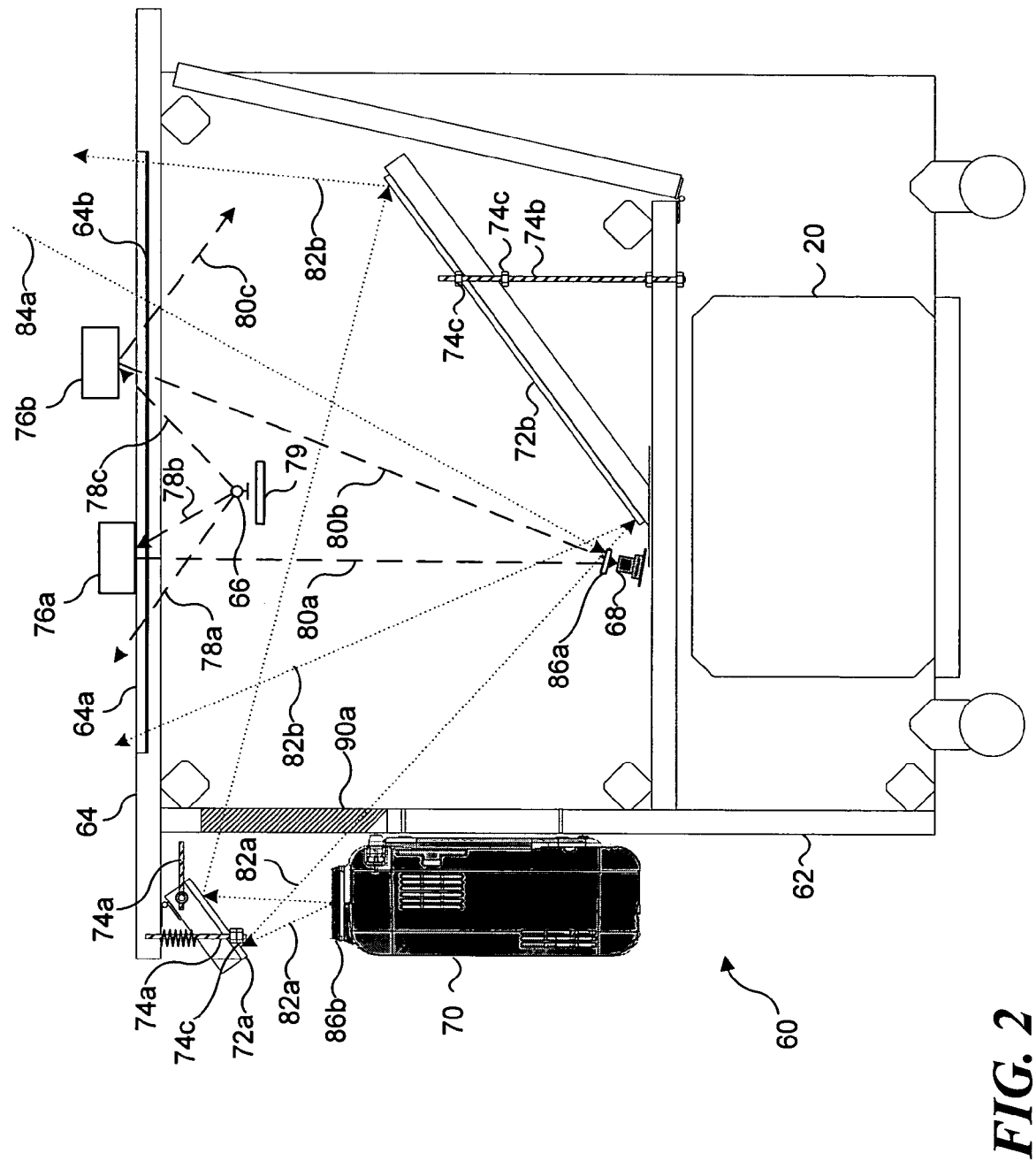
FIG. 2 is an illustration of the interior of the interactive table showing hardware components of the interactive table, the paths followed by light within the interactive table, and exemplary objects disposed on and above the surface of the table.

In FIG. 2, an exemplary interactive table 60 is shown that includes PC 20 within a frame 62 and which serves as both an optical input and output device for the computer. In this cut-away Figure of the interactive table, rays of light used for displaying graphic images are generally illustrated using dotted lines, while rays of infrared (IR) light used for sensing objects on or just above a display surface 64a are illustrated using dash lines. Display surface 64a is set within a table surface 64 of the interactive table. The perimeter of the table surface is useful for supporting a user's arms or other objects that are not yet being used to interact with the graphic images or virtual environment being displayed on display surface 64a, but is clearly not required.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table comprising a sheet of vellum or other suitable material with light diffusing properties. A sheet of a transparent material, such as clear plastic, can be used to support the light diffusing material employed for translucent layer 64b, if needed. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78*a*;

illuminate objects on the table surface, as indicated by dash line 78*b*; or illuminate objects a short distance above the table surface but not touching the table surface, as indicated by dash line 78*c*.

Objects above display surface 64*a* include a "touch" object 76*a* that rests atop the display surface and a "hover" object 76*b* that is close to but not in actual contact with the display surface. As a result of using translucent layer 64*b* under the display surface to diffuse the IR light passing through the display surface, as an object approaches the top of display surface 64*a*, the amount of IR light that is reflected by the object increases to a maximum level that is achieved when the object is actually in contact with display surface 64*a*.

A digital video camera 68 is mounted to frame 62 below display surface 64*a* in a position appropriate to receive IR light that is reflected from any touch object or hover object disposed above display surface 64*a*. Digital video camera 68 is equipped with an IR pass filter 86*a* that transmits only IR light and blocks ambient visible light traveling through display surface 64*a* along dotted line 84*a*. A baffle 79 is disposed IR source 66 and the digital video camera to prevent IR light that is directly emitted from the IR source from entering the digital video camera, since it is important that this digital video camera should produce an output signal that is responsive to the IR light reflected from objects that are a short distance above or in contact with display surface 64*a*. Care was taken in selecting the positions of these IR LEDs to avoid specular reflections caused as a result of secondary reflections from mirror 72*b* (FIG. 2) or direct IR light reaching the vision system. These specular reflections and direct IR light can cause dead spots in the vision system that interfere with sensing objects on the display surface. It will be apparent that digital video camera 68 will also respond to any IR light included in the ambient light that passes through display surface 64*a* and into the interior of the interactive display (e.g., ambient IR light that also travels along the path indicated by dotted line 84*a*).

IR light reflected from objects on or above the table surface may be:

reflected back through translucent layer 64*b*, through IR pass filter 86*a* and into the lens of digital video camera 68, as indicated by dash lines 80*a* and 80*b*; or be reflected or absorbed by other interior surfaces within the interactive display without entering the lens of digital video camera 68, as indicated by dash line 80*c*.

Translucent layer 64*b* diffuses both incident and reflected IR light. Thus, as explained above, "hover" objects that are closer to display surface 64*a* will reflect more IR light back to digital video camera 68 than objects of the same reflectivity that are farther away from the display surface. Digital video camera 68 senses the infrared light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or code (e.g., a bar code) on its bottom surface that is specific to that object or to a class of related objects of which that object is a member. Accordingly, the imaging signal from digital video camera 68 can also be used for detecting such specific object, as well as determining its orientation, based on the IR light reflected from its reflective pattern.

Figure 6:
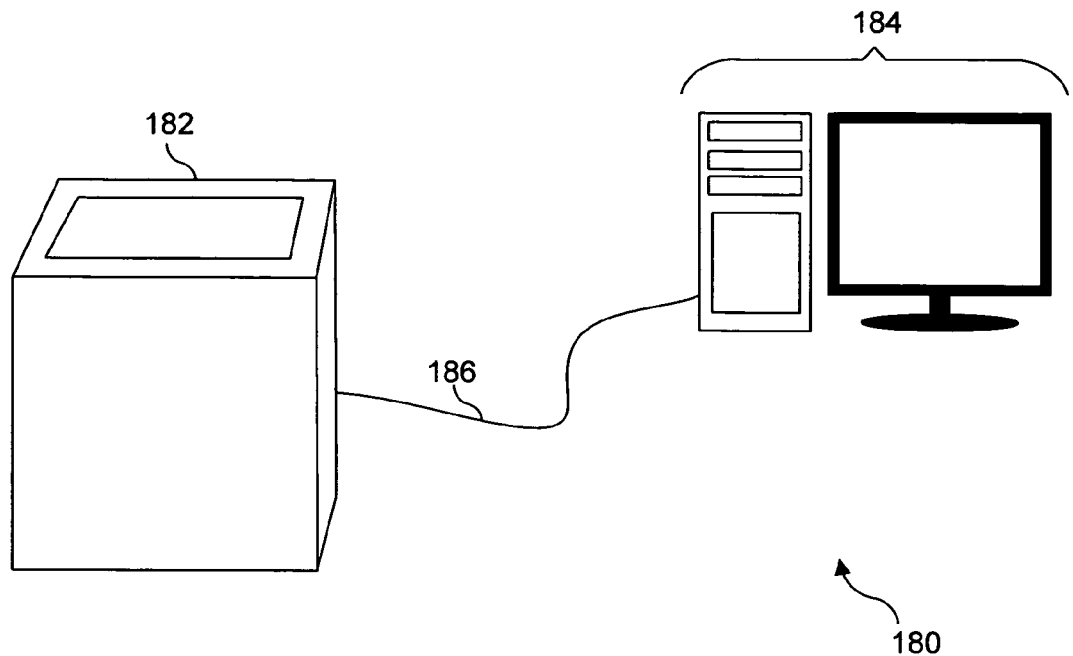
FIG. 6 is a block diagram illustrating how the present invention can be implemented as an interactive display that is coupled to a stand alone personal computer or other computing device.

PC 20 may be integral to interactive table 60 as shown in FIG. 2, or alternatively, may instead be external to the interactive table, as shown in the embodiment of FIG. 6. In FIG. 6, an interactive table 182 is connected through a data cable 186 to an external PC 184 (which includes the optional monitor, as mentioned above). If the interactive table is connected to an external PC 184 or to some other type of computing device, such as a set top box, video game, laptop computer, or media computer, then the interactive table comprises an input/output device. Data cable 186, which connects external PC 184 to interactive table 182 can be coupled to a USB 2.0 port, an Institute of Electrical and Electronics Engineers (IEEE) 1394 (or Firewire) port, or an Ethernet port on PC 184. It is also contemplated that as the speed of wireless connections continues to improve, the interactive table might also be connected to a computing device such as PC 184 via such a high speed wireless connection, or via some other appropriate data wired or wireless communication link. Whether included either internally as an integral part of the interactive display, or externally, the PC executes algorithms for processing the digital images from digital video camera 68 and executes software applications that are designed to use the more intuitive user interface functionality of interactive table 60 to good advantage, as well as executing other software applications that are not specifically designed to make use of such functionality, but can still use the input and output capability of the interactive table.

An important and powerful feature of the interactive table (either of the embodiments discussed above) is its ability to display graphic images or a virtual environment for games or other software applications and to enable an interaction between the graphic image or virtual environment visible on display surface 64*a* and objects that are resting atop the display surface or are hovering just above it.

Again referring to FIG. 2, interactive table 60 includes a video projector 70 that is used to display graphic images, a virtual environment, or text information on display surface 64*a*. The video projector preferably comprises a liquid crystal display (LCD), or digital light processor (DLP) display type, or a liquid crystal on silicon (LCOS) display type, with a resolution of at least 640×480 pixels. An IR cut filter 86*b* is mounted in front of the projector lens of video projector 70 to prevent any IR light emitted by the video projector from entering the interior of the interactive table and interfering with the IR light reflected from object(s) on or above display surface 64*a*. A first mirror assembly 72*a* directs projected light traveling from the projector lens along dotted path 82*a* through a transparent opening 90*a* in frame 62, so that the projected light is incident on a second mirror assembly 72*b*. Second mirror assembly 72*b* reflects the projected light onto translucent layer 64*b*, which is at the focal point of the projector lens so that the projected image is visible in focus on display surface 64*a* for viewing.

Alignment devices 74*a* and 74*b* are provided and include threaded rods and rotatable adjustment nuts 74*c* for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64*b*, and more importantly, helps in achieving a desired size and shape of the interactive display table, so that the interactive display table is not too large and is sized and shaped so as to enable the user to sit comfortably next to it.

Interaction Between Physical and Virtual Objects Within a Virtual Environment

Figure 4:
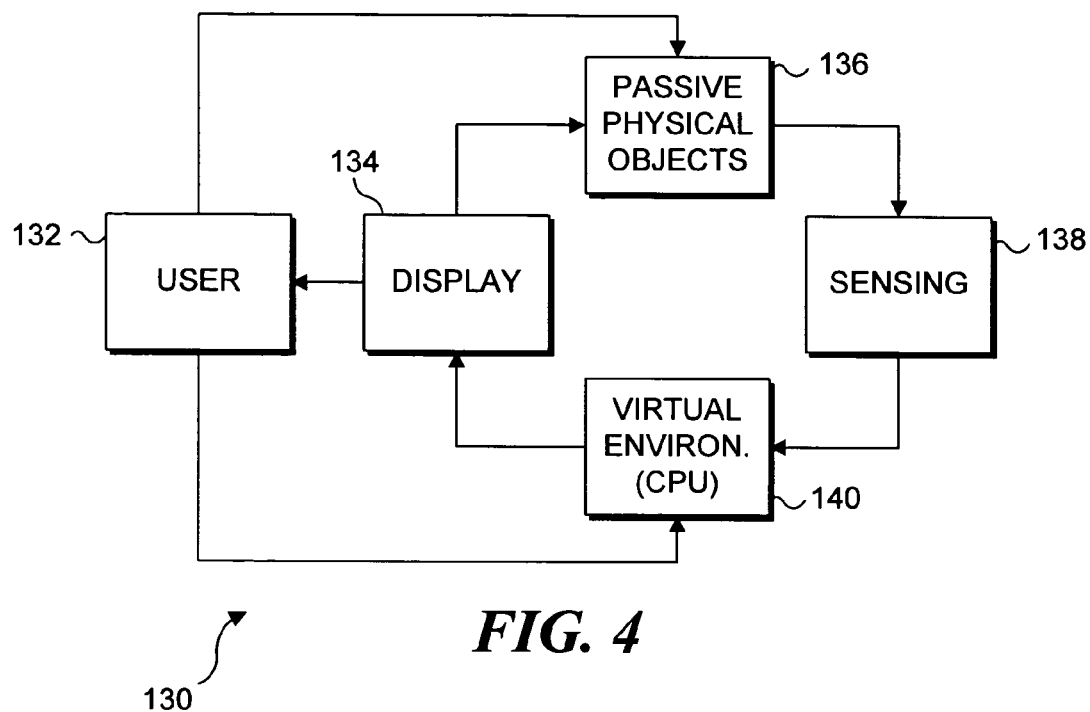
FIG. 4 is a functional block diagram illustrating how an active physical object is sensed and interacts with a virtual environment displayed on the interactive display.

A functional block diagram 130 in FIG. 4 illustrates how a passive physical object 136 interacts with a user and a virtual environment, in accord with the present invention. (The term "passive physical object" is sometimes shortened herein simply to "passive object.") As shown in this diagram, a user 132 can place a passive physical object 136 on or near a display 134. The presence of passive physical object 136 on the display surface is detected by a sensing function 138, which in interactive table 60 is carried out by digital video camera 68 detecting IR light that is reflected from the bottom of the passive physical object where the passive physical object either rests on or is positioned immediately above display 134. The signal indicative of the passive physical object is supplied to the software that is executed by a CPU to produce a virtual environment 140 to enable the virtual environment to be aware of and respond to the presence of the passive physical object. Although not shown in FIG. 4, in addition to positioning and moving physical object on or immediately above display 134, user 132 can provide other sources of input to virtual environment 140, either by way of a keyboard, a pointing device, or by simply interacting within the virtual environment, e.g., by selecting menu items, etc. Since virtual environment 140 is imaged on display 134, the software program producing the virtual environment can cause virtual objects within the virtual environment to respond to the presence of physical object 136, as well as to its position, orientation, size, and any encoded information included on the physical object that identifies it uniquely, or as one of a group of physical objects that are in a common class. Examples of the types of interactions that can occur between the user, the passive physical object, and the virtual environment are discussed below.

Figure 5:
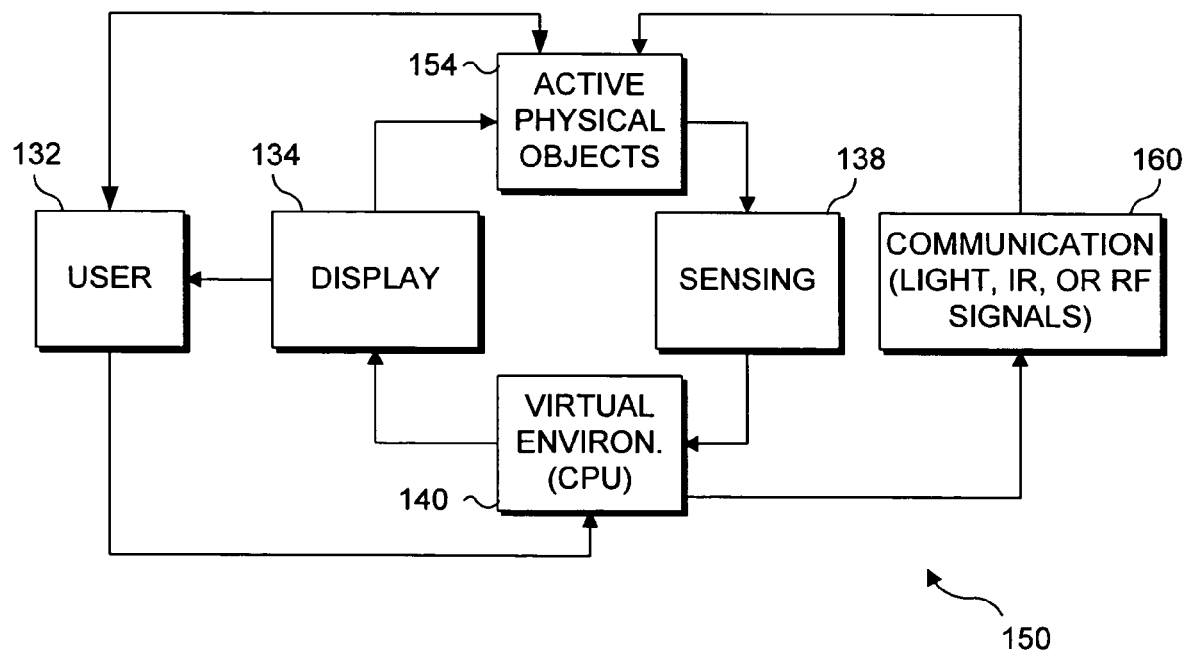
FIG. 5 is a functional block diagram illustrating how a active physical object interacts with a virtual environment displayed on the interactive display.

A functional block diagram 150 in FIG. 5 shows how an active physical object 154 interacts with displayed images 156 in a virtual environment. (The term "active physical object" is sometimes shortened herein simply to "active object.") Active physical objects 154 are physical objects that are capable of performing one or more active functions perceptible to a user, so that there can typically be a two-way interaction between each active object and the user. Active object 154 is detected when either set on display 134 or "hovered" immediately above the display. To sense active objects 154, IR light reflected from the active object placed on or directly above display 134 is detected by a sensing system 158, which as noted above, in a preferred embodiment includes the IR-sensitive digital video camera. The signal produced by the sensing system is digitized, and the location of the active object upon the display surface, and optionally, the shape, orientation, and any specific encoded information provided on the active object to identify it are provided to the CPU that produces virtual environment 140. Again, user 132 interacts with the displayed images of the virtual environment, as well as with active objects 154. However, the user may interact with active objects 154 to a greater extent than simply placing the active object at a specific location on the display surface. For example, if the active object is a self-propelled vehicle, user 132 can employ an RC device or another type of controller that is connected to active object 154 to control the direction, speed, and other active functions that is can perform. Active object 154 can interact with display 134, since the software that produces graphic images of virtual environment 140 on the display also can produce signals that control active objects 154. Preferably, the control of the active object should be through a controller that is coupled to the PC, to enable the PC to interject some limits on the user's control of the object and prevent a user from controlling the object so that it inappropriate interacts with other passive or active objects on or off the table. For example, the PC can prevent the user from running the active object off the display surface or using the active object to move a passive object that is not supposed to be thus moved, within the rules of the software virtual environment.

As noted above, one form of active function of which certain types of active physical objects are capable is moving about on the display surface. However, active objects 154 can implement other active functions that are perceptible to user 132. For example, active objects 154 can emit light, possibly of one or more different color lights in response to conditions in the virtual environment. Similarly, active objects 154 can produce audible signals or tones, perhaps of different pitches depending upon the status of a virtual object or other graphic images within the virtual environment being displayed. Instead of producing an audible tone, active objects 154 might vibrate. In each of these examples of active functions, active objects 154 interact with the virtual environment, so that the active object appears to be a part of the virtual environment and not a discrete and separate entity.

The virtual environment that is displayed can control active objects 154 and the active functions they implement in a number of different ways. Within the virtual environment, the IR video camera is used to "close the loop" such that errors in the controlled movement of an object can be corrected, using standard techniques in control theory. For example, a user of the PC can control an active object to move in a straight line across the display surface, even though the motors on the active object may not be capable of such precise control, without the benefit of the vision system feedback. As indicated in a block 160, the virtual environment (or the CPU producing it) can communicate with the active object by using light to which the active object responds and which is part of the displayed image, or produce an RF signal, or use IR light, or some other signal to communicate with the active object. Thus, if the virtual environment includes a spot of visible light that moves around on the display surface, active object 154 can effectively follow the spot of light, being controlled by the software application program that produces the displayed images. In a game that is played using the interactive display, the CPU creating the virtual environment may control one or more active objects while the users control other active objects. The active objects may also function as passive objects, since the mere presence of the active object on the display surface can cause the virtual environment to appropriately respond to the mere presence of the active physical object at that location.

Some examples may help to illustrate how various interactions can occur between passive objects and the virtual environment, and between active objects and the virtual environment. For example, if a user is playing a pinball arcade game in which a pinball game layout comprises the virtual environment that appears upon the display surface, the user may place a passive object configured as a bumper within the pinball game image appearing on the display surface. If a virtual object representing a pinball is launched and "strikes" the bumper placed by the user, the virtual image will be caused to rebound and a virtual flash of light made to appear along with a sound being generated by the virtual environment. If the user repositions the passive object serving as a bumper, the virtual game environment will sense the new position and orientation of the passive object and the response of the pinball "striking" the bumper in its new position will again produce a predefined response.

If the user then positions an active object representing a round bumper on the pinball game board displayed as the virtual environment, a different type of response can be created. If the virtual pinball "strikes" the round bumper, the virtual environment can produce a light signal under the active object to which it responds by vibrating and producing a pulse of light from a light source contained within the active object, and/or by producing a predefined ringing sound. The virtual environment can produce other visual lighting effects or flashes under the active object when the pinball strikes the active agent.

The pinball can be made to move within the virtual environment of the pinball game in a direction and with a force appropriate for the motion of the pinball when "striking" active or passive objects, so that the virtual pinball rebounds off the physical object in a direction defined by the laws of physics. To make the active object light up or emit sound, or vibrate, the virtual environment can direct a visible or IR light pulse to a receptor on the undersurface of the active object at the time the virtual object impacts the active object, causing the active object to implement its active function. Furthermore, the light signal that is transmitted to the active object within the virtual environment can be encoded to cause the active object to carry out different active functions, depending upon the particular code sequence that is received by a sensor disposed on the undersurface of the active object.

Figure 7:
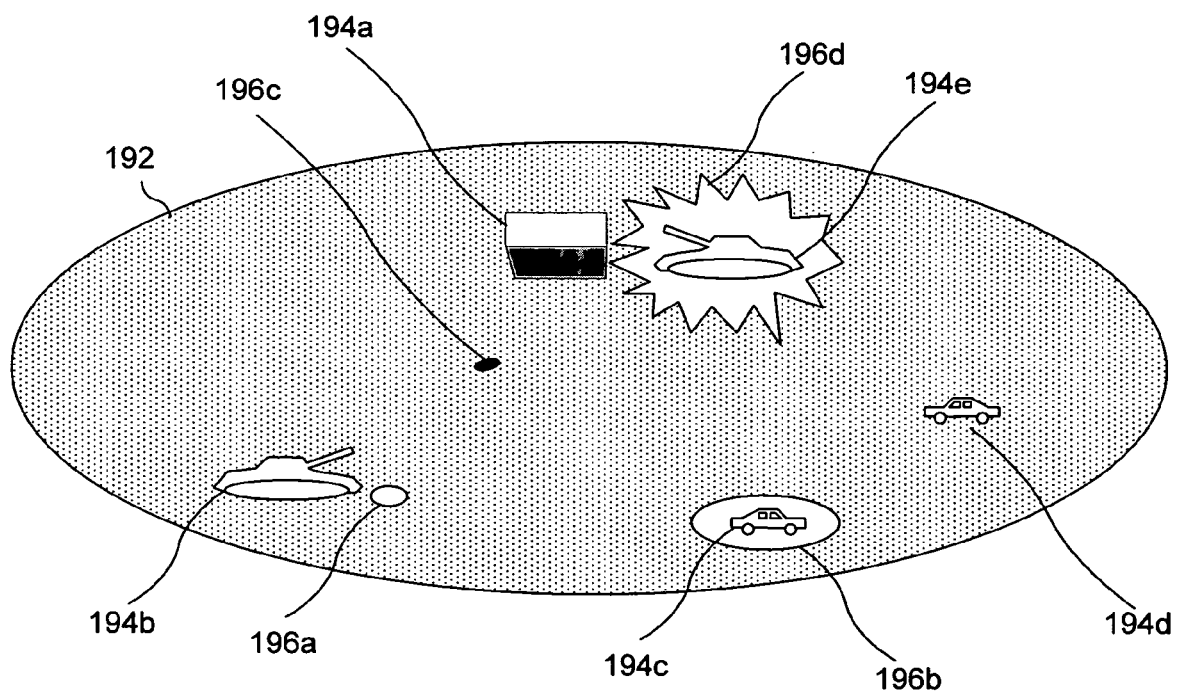
FIG. 7 is an isometric view of a display surface illustrating a plurality of passive and active objects in regard to their interaction with a virtual environment.

FIG. 7 illustrates several different physical objects that can interact with a virtual image 190 when the physical object is placed on a display surface 192. As shown in FIG. 7, a passive object 194a represents a wall within the virtual environment. Another type of passive object represents a user interface control, such as a knob or a linear pad, which is moved by a user by rotating or sliding the physical object to change a physical parameter of the virtual environment. Almost any parameter, such as a volume level, can thus be adjusted, and the movement of the passive object can be used to select one of a plurality of menu items. Other passive objects include object, which when brought into contact with display surface 192 and drawn across the surface, cause a corresponding image to be displayed by the virtual environment representing a stroke that varies in thickness and other characteristics, as a function of the pressure applied to the object against the display surface. The characteristics of the stroke change in response to the area of object that contacts the display surface. Also useful in drawing software programs are passive objects that represent a stylus so that the user can draw with the passive object simply by moving it over the display surface. Similarly, the passive object may be an eraser that can remove portions of an image displayed on the display surface by moving the eraser over that portion of the displayed image.

A tank 194b in FIG. 7 is shown following a dot of light 196a as it moves about on display surface 192. To respond to the dot of light, tank 194b includes a photoreceptor (not separately shown) that is responsive to the wavelength of light used for creating dot 196a. Alternatively, tank 194b can be controlled using an RF signal transmitted by the virtual environment software program as is an RC tank 194e.

In this example, the user has placed passive object 194a in the path of tank 194e, and it represents a massive wall that would stop an actual tank in the virtual environment. The virtual environment will respond to the detection of passive object 194a, its shape, location, and orientation. Since passive object 194a represents a wall at the location in the virtual environment where its position is sensed, the virtual environment will not permit tank 194e to advance through the region occupied by passive object 194a within the virtual environment. Thus, the passive object representing a wall is treated as a part of the virtual environment that effects the movement of a physical object 194e controlled by the virtual environment.

Physical objects can also respond to virtual objects such as a shell 196c fired by tank 194b. In response to being struck by such a shell, a virtual explosion 196d can be made to visibly appear around tank 194e, indicating that the virtual shell has struck the tank.

Active objects 194c and 194d correspond to cars or other vehicles that are also controlled either by the user using an RF or wired control (not shown) or by the virtual environment using either a RF control, a pulsed IR light signal source to which a light sensor on the active object is responsive when the IR light signal is projected through display surface 192, or visible light 196b. Any of these signals can be used to control the direction in which active object 194c moves on display surface 192.

Active objects 194b, 194c, 194d, and 194e, which carry out functions requiring electrical power to energize the active object, will typically either include a rechargeable (or non-rechargeable) battery or use a capacitive charge power source (if only a minimal amount of electrical power is required). FIG. 12 illustrates an exemplary power charging station 300 that is coupled to an AC line source 302, and converts AC line voltage to an appropriate charge signal to deliver a charge to an active object 304 that uses electrical energy to carry out its active function. A rechargeable battery or alternatively, a capacitive charge storage is included within powered active object 304. Alternatively, power charging station 300 may itself comprise a battery that is used for charging the energy source within the active object. Thus, the active object is coupled to power charging station 300 to receive a charge between uses of the active object on the interactive display.

Another feature of passive objects as used in the present invention, that has not yet been discussed is that a specific portion of a displayed image can be projected onto the display surface occupied by a passive object so that the portion of the displayed image appears to be part of the passive object, i.e., as if affixed to the bottom surface of the passive object. FIG. 11 illustrates a simple example in which a child's spelling game uses this feature. In this example, the virtual environment that is projected onto display surface 64a includes an instruction to the user to "Spell Word Here," i.e., on the displayed line. Scattered about on display surface 64a are a plurality of passive objects 220 that made of a transparent plastic material and have an IR encoded pattern (invisible to the human eye) applied to the undersurface of each of the passive objects. An example of such a pattern is shown on one passive object. Thus, each passive object 220 can be uniquely identified, so that letters projected under the control of the spelling game program as a portion of the image on the display surface will thereby be associated with each of passive objects 220. Although not shown in this simple example, the spelling program might also display a picture of a rake so that the child user will try to arrange the blocks comprising passive objects 220 in an appropriate order on the line indicated, to spell the word "RAKE." As the user slides each block around on display surface 64a, the corresponding letter projected onto the undersurface of the passive object moves with that passive object and maintains the orientation of the passive object as the passive object is turned and moved about on the display surface. Another example using this technique would be in connection with a software application that causes parts of a puzzle image to be projected onto passive objects that are resting on the display surface. The user can selectively arrange the passive objects to complete the puzzle by linking each passive object and thus the portion of the image projected on the passive object with other passive objects and their corresponding portions of the image to form the completed image that the puzzle represents. The images can also be video or non-static images as well.

Another interaction between physical objects and virtual objects that are displayed within the virtual environment relates to avoiding the display of a virtual object where at least a portion of it would be obscured by a physical object placed on the display surface by a user or the software. It is assumed that the physical object is not transparent. The interference between the display of a virtual object and a physical object that has been positioned on the board requires that the virtual environment be aware of the location and size of the physical object. It is generally preferable to create a prioritized list of locations for displaying a virtual object to avoid interference not only with physical objects that have been moved about or positioned on the display surface, but also with other aspects of the virtual display.

Figure 8:
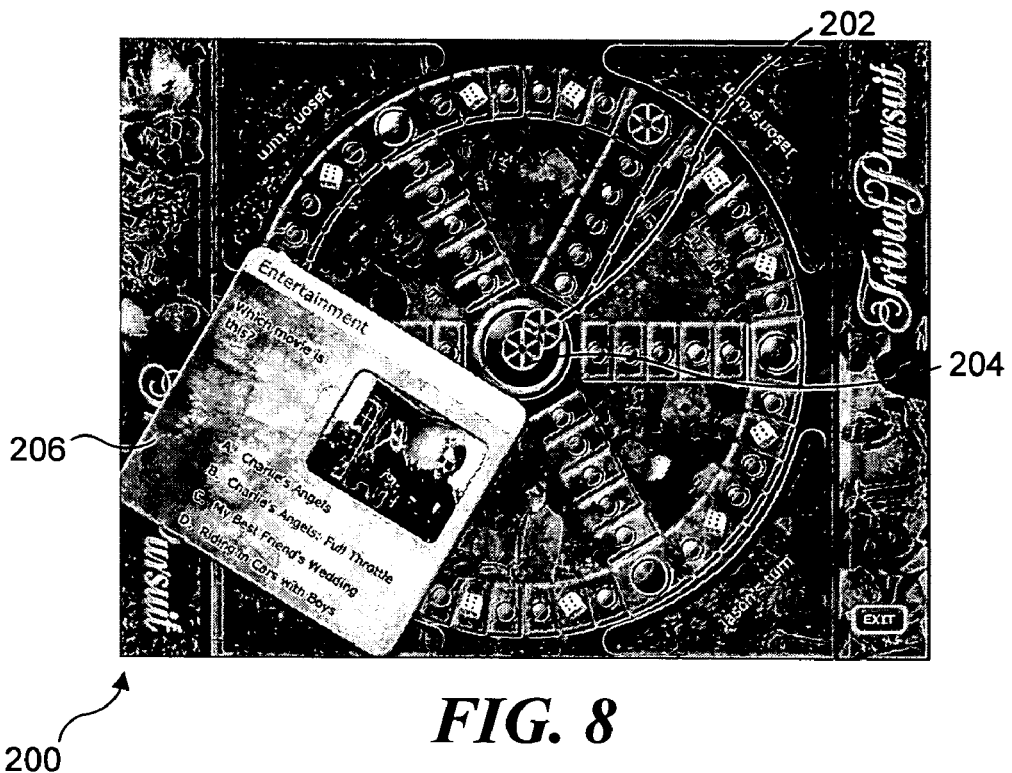
FIG. 8 illustrates an exemplary virtual environment game board for a "TRIVIAL PURSUIT" game, showing how a virtual entity, i.e., a question card, is displayed at a position adjacent a corner of the game board to avoid visual interference from a plurality of player pieces that are disposed in the center of the game board.
Figure 9:
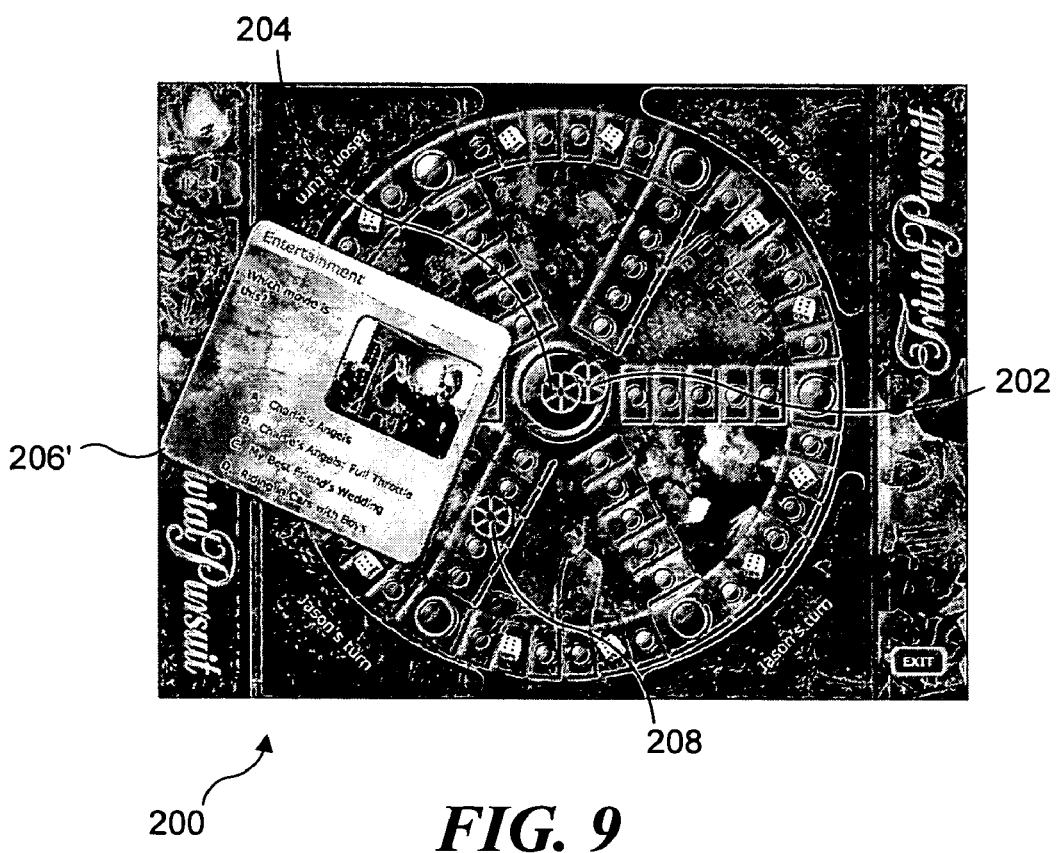
FIG. 9 is a further example of the game board shown in FIG. 9, with a question card (reduced in size) displayed at a different position to avoid the interference of a player piece disposed on the display surface at about the position where the question card was displayed in FIG. 9.
Figure 10:
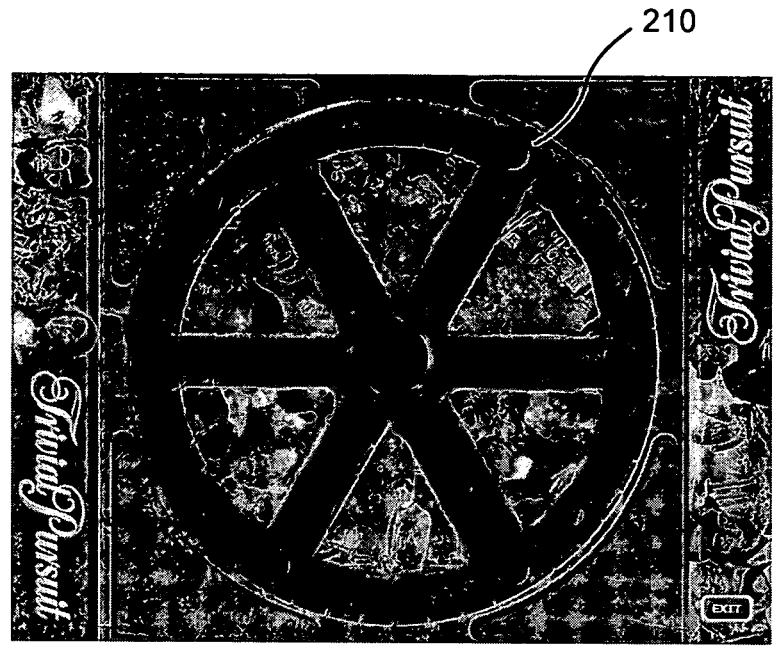
FIG. 10 illustrates a wheel hub portion of the game board from FIGS. 9 and 10, wherein the wheel hub represents the possible locations where physical objects (i.e., the player pieces) might be during the play of the game, so that a prioritized list of positions at which the virtual entity (i.e., the question cards) can be displayed to avoid visual interference by the player pieces.

FIGS. 8, 9, and 10 illustrate an example showing how this aspect of the present invention is implemented. In this example, a virtual environment 200 represents the display of a TRIVIAL PURSUIT™ game board. Each player's progress within the game is indicated by the position of a physical object. The physical objects thus represent player pieces 202, 204, or 208, each of which is assigned to a different player. As shown in FIG. 8, player pieces 202 and 204 are generally located at the center or hub of the wheel-like display for virtual environment 200. As each player has a turn, the software program that creates virtual environment 200 on the display surface displays a virtual question card 206 to the player whose turn is current, soliciting the player's response to the question to determine if the player piece can advance within the game. Assuming that the current player is physically located adjacent to the southwest corner of virtual display 200, as shown in FIG. 8, a highest priority location for displaying question card 206 would be in the southwest corner of the virtual display. This position has the highest priority since it best enables the player next to that display position to easily read the question on the question card. Since question card 206 is a virtual object, the software program generating virtual display 200 can selectively display the question card at different prioritized locations. In this case, the southwest location having the highest priority is selected and used, since there is no interference with player pieces 202 or 204 that are disposed in the center or hub of the virtual environment game board.

In FIG. 9, however, player piece 208, which is the passive object now disposed on the southwest spoke of the virtual environment, precludes the virtual object corresponding to the question card from being displayed in the southwest position used in FIG. 8. Indeed, none of the prioritized or ordered positions that are relatively close to the player who needs to respond to the question card are available. In this case, a virtual object 206' is displayed corresponding to the question card, but virtual object 206' is reduced in size relative to virtual object 206, so that it can be displayed at a second highest priority location on the display surface without any interference occurring between the question card and the physical objects disposed on the display surface.

FIG. 10 illustrates that in determining the prioritized or ordered list for optional locations at which the virtual object comprising the question card might be displayed, the geometric shape of a hub-wheel design 210 that is used in the Trivial Pursuit game is considered in creating the prioritized list of display positions for the virtual object, since player pieces that are physically placed on the display surface can only be placed on the rim, the spokes, or hub of the board design. Accordingly, it should be evident that for each different software application program that is being used in generating a virtual environment on the display surface, different criteria will affect the determination of the prioritized list of positions at which a virtual object can be displayed.

Figure 3:
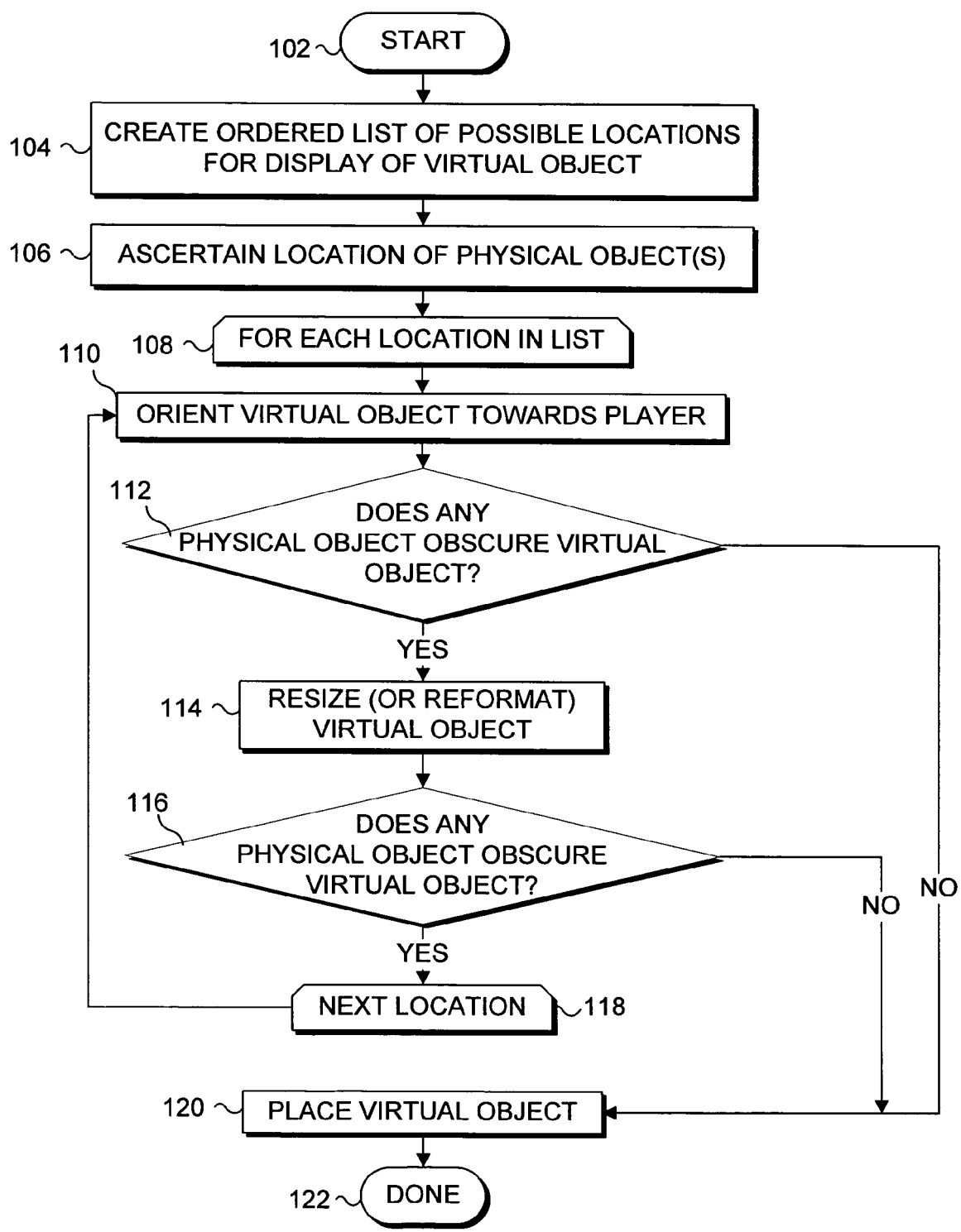
FIG. 3 is a flow chart illustrating the logical steps carried out in avoiding visual interference between a physical object on a display surface and a virtual object that is imaged on the display surface, accord with this invention.

A flow chart 100 in FIG. 3 illustrates the logical steps used in determining where to display a virtual object to avoid interference with physical objects that are disposed on the display surface. Following a start block 102, a step 104 provides for creating the ordered list of possible locations for the display of the virtual object. As already noted in connection with FIG. 10, the prioritized list may be ordered to consider the location of the user that will be interacting with the virtual object as well as the layout of the virtual environment, for example, as shown in FIG. 10, which will likely define the possible locations where physical objects might be placed. In addition, the prioritization may take into consideration that the virtual object may include portions that can be obscured by the physical object without important information being hidden. For example, a border around a virtual question card could be obscured without affecting the user's ability to read the text on the virtual question card. Next, a step 106 ascertains the location of the physical object or objects on the display surface, e.g., based upon the reflected IR light that is received by the digital video camera included in the interactive display.

A step 108 then determines for each location in the prioritized list whether the virtual object should be displayed there. In step 110, the program orients the virtual object toward the player as it will be displayed. A decision step 112 then determines if any physical object is disposed on the display surface at that location, so as to at least partially interfere with the virtual object. If so, a step 114 resizes the virtual object so that it is smaller, or alternatively, reformats the virtual object by changing either its size or shape to fit around the physical object. Then again, a decision step 116 determines if any physical object will obscure the virtual object as thus resized or reformatted. If so, the logic proceeds with step 118, which then evaluates the next location in the prioritized or ordered list of possible locations. If either the determination in decision step 112 or in decision step 116 is negative, the logic proceeds to a step 120, which places the virtual object at the then current location either in its original size if the logic has come from decision step 112, or in its reduced size (or altered format) if the logic has come from decision step 116. Following an affirmative response to decision step 116, step 118 proceeds back to step 110 to repeat the process for the next location in the ordered list. Once the virtual object has been placed (i.e., displayed) on the display surface in decision step 120, the logic is completed in step 122. The logic discussed above that employs a prioritized list of positions is simply exemplary, and it will be appreciated that other constraint satisfaction or optimization techniques for displaying virtual images to avoid interference with physical objects that have been placed on the display surface can instead be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling interaction between a virtual environment and a physical object, comprising the steps of:
   (a) detecting the physical object and its location when the physical object is placed atop a display surface on which the virtual environment is displayed, said physical object being detected on the display surface by optically sensing light reflected from the physical object from below the display surface;
   (b) within the virtual environment, producing a response to the physical object as if the physical object were included in the virtual environment, enabling an interaction between the physical object and the virtual environment in two different modes, depending upon a type of the physical object placed atop the display surface, said two different modes including:
      (i) a first mode in which the virtual environment responds to a presence of the physical object on the display surface; and
      (ii) a second mode in which the physical object that is placed atop the display surface comprises an active object that is capable of performing an active function perceptible to a user, automatically in response to the virtual environment, and wherein the active object, which is placed atop the display surface, interacts with the virtual environment in the second mode by performing said active function atop the display surface automatically in response to the virtual environment;
   (c) tracking movement of the physical object relative to the display surface by sensing changes in location of the physical object on the display surface; and
   (d) changing a value of at least one parameter in the virtual environment in response to the movement of the physical object relative to the display surface.

2. The method of claim 1, wherein the step of producing the response in the first mode comprises the step of causing a virtual object in the virtual environment to interact with the physical object.

3. The method of claim 2, wherein the interaction of the virtual object with the physical object comprises the step of automatically preventing the virtual object from moving through a region in the virtual environment where the physical object is located atop the display surface.

4. The method of claim 1, further comprising the step of detecting at least one of a size and a shape of the physical object in the first mode, to enable the predefined response to the physical object within the virtual environment.

5. The method of claim 1, further comprising the step of identifying the physical object based upon the light reflected from the physical object, said light that is reflected being encoded with a predefined pattern that is optically detected below the display surface.

6. The method of claim 5, wherein the physical object to which the virtual environment responds in the first mode comprises a passive object that does not perform any active function.

7. The method of claim 5, wherein the physical object is an active object that actively performs an active function in connection with the virtual environment and the active function is perceptible to the user, said active object and the virtual environment interacting in either or both the first mode and the second mode.

8. The method of claim 7, further comprising the step of producing a signal in the virtual environment in the second mode, said signal being detected by the active object, causing the active object to perform the active function.

9. The method of claim 7, wherein the active function comprises the step of producing one of:
   (a) a visually perceptible state of the active object;
   (b) an audibly perceptible state of the active object;
   (c) a movement of the active object over the display surface; and
   (d) a vibration of at least a portion of the active object.

10. The method of claim 7, wherein the active object is mobile and moves itself over the display surface to interact with the virtual environment.

11. The method of claim 7, further comprising the step of enabling the active function of the active object to be controlled by the user.

12. The method of claim 7, further comprising the step of enabling the active function performed by the active object to be controlled by a software program that produces the virtual environment.

13. The method of claim 7, wherein electrical power is provided to the active object by one of a battery and a charged capacitor to enable the active object to perform the active function.

14. The method of claim 1, further comprising the step of displaying a projected image limited to the location of the physical object and visible through the physical object at the location of the physical object on the display surface so that the projected image visible through the physical object appears to be part of the physical object, but is part of an overall image of the virtual environment that is displayed on the display surface.

15. The method of claim 1, further comprising the steps of:
   (a) displaying a virtual entity, wherein the virtual entity comprises one of a virtual object and information on the display surface; and
   (b) displaying the virtual entity at a position selected to avoid a visual interference between the virtual object and the physical object disposed on the display surface.

16. The method of claim 15, further comprising the step of providing a plurality of prioritized positions at which the virtual entity can be selectively displayed to avoid the interference with the physical object, a position having a higher priority being selected for display of the virtual entity to avoid the interference with the physical entity.

17. The method of claim 15, further comprising the step of determining a position of a specific user who will be visually perceiving the virtual entity, so that the virtual entity is oriented and displayed at a position automatically selected so as to facilitate the specific user readily visually perceiving the virtual entity, while also avoiding visually interfering with the physical object.

18. The method of claim 15, further comprising the step of reducing a size of the virtual entity to avoid interference with the physical object at the position where the virtual entity is displayed on the display surface.

19. The method of claim 15, further comprising the step of reformatting a shape of the virtual entity to avoid interference with the physical object at the position where the virtual entity is displayed on the display surface.

20. A memory medium on which are stored machine executable instructions for carrying out the steps of claim 1.

21. A method as recited in claim 1, wherein said active function comprises vibrating.

22. A method as recited in claim 1, wherein said active function comprises generating sound.

23. A method as recited in claim 1, wherein said active function comprises emitting light.

24. A method for enabling interaction between a virtual environment and a physical object, comprising the steps of:
- (a) detecting the physical object and its location when the physical object is placed atop a display surface on which the virtual environment is displayed, said physical object being detected on the display surface by optically sensing light reflected from the physical object from below the display surface;
- (b) within the virtual environment, producing a response to the physical object as if the physical object were included in the virtual environment, enabling an interaction between the physical object and the virtual environment in two different modes, depending upon a type of the physical object placed atop the display surface, said two different modes including:
  - (i) a first mode in which the virtual environment responds to a presence of the physical object on the display surface; and
  - (ii) a second mode in which the physical object that is placed atop the display surface comprises an active object that is capable of performing an active function perceptible to a user, automatically in response to the virtual environment, and wherein the active object, which is placed atop the display surface, interacts with the virtual environment in the second mode by performing said active function atop the display surface automatically in response to the virtual environment;
- (c) displaying a virtual entity, wherein the virtual entity comprises one of a virtual object and information on the display surface; and
- (d) displaying the virtual entity at a position selected to avoid a visual interference between the virtual object and the physical object disposed on the display surface.

25. The method of claim 24, further comprising a step of providing a plurality of prioritized positions at which the virtual entity can be selectively displayed to avoid the interference with the physical object, a position having a higher priority being selected for display of the virtual entity to avoid the interference with the physical entity.

26. The method of claim 24, further comprising a step of determining a position of a specific user who will be visually perceiving the virtual entity, so that the virtual entity is oriented and displayed at a position automatically selected so as to facilitate the specific user readily visually perceiving the virtual entity, while also avoiding visually interfering with the physical object.

27. The method of claim 24, further comprising a step of reducing a size of the virtual entity to avoid interference with the physical object at the position where the virtual entity is displayed on the display surface.

28. The method of claim 24, further comprising a step of reformatting a shape of the virtual entity to avoid interference with the physical object at the position where the virtual entity is displayed on the display surface.

29. A memory medium on which are stored machine executable instructions for carrying out the steps of claim 24.

30. A method for enabling interaction between a virtual environment and a physical object, comprising the steps of: (a) detecting the physical object and its location when the physical object is placed atop a display surface on which the virtual environment is displayed, said physical object being detected on the display surface by optically sensing light reflected from the physical object from below the display surface; (b) within the virtual environment, producing a response to the physical object as if the physical object were included in the virtual environment, enabling an interaction between the physical object and the virtual environment in two different modes, depending upon a type of the physical object placed atop the display surface, said two different modes including: (i) a first mode in which the virtual environment responds to a presence of the physical object on the display surface; and (ii) a second mode in which the physical object that is placed atop the display surface comprises an active object that is capable of performing an active function perceptible to a user, automatically in response to the virtual environment, wherein the active function comprises at least one of vibrating, generating sound or emitting light, and wherein the active object, which is placed atop the display surface, interacts with the virtual environment in the second mode by performing said active function atop the display surface automatically in response to the virtual environment, the method further including: (c) tracking movement of the physical object relative to the display surface by sensing changes in location of the physical object on the display surface; and (d) changing a value of at least one parameter in the virtual environment in response to the movement of the physical object relative to the display surface.

31. A method as recited in claim 1, wherein said active function comprises vibrating.

32. A method as recited in claim 1, wherein said active function comprises generating sound.

33. A method as recited in claim 1, wherein said active function comprises emitting light.

34. A memory medium on which are stored machine executable instructions for carrying out the steps of claim 30.

* * * * *